US006962531B2

(12) United States Patent
Pace et al.

(10) Patent No.: US 6,962,531 B2
(45) Date of Patent: Nov. 8, 2005

(54) AUTOMATED SERVICE SCHEDULING SYSTEM

(75) Inventors: Mark C. Pace, Las Vegas, NV (US); Thomas W. Cook, Linwood, NJ (US)

(73) Assignee: Harrah's Operating Company, Inc., Las Vegas, NV (US)

( * ) Notice: Subject to any disclaimer, the term of this patent is extended or adjusted under 35 U.S.C. 154(b) by 0 days.

(21) Appl. No.: 09/782,616

(22) Filed: Feb. 12, 2001

(65) Prior Publication Data

US 2002/0058550 A1 May 16, 2002

Related U.S. Application Data

(60) Provisional application No. 60/245,903, filed on Nov. 3, 2000.

(51) Int. Cl.[7] .............................................. A63F 9/24
(52) U.S. Cl. .............................. 463/42; 463/20; 705/9; 705/11; 700/1
(58) Field of Search ................................ 463/1, 16–20, 463/25–29, 40–42; 705/5, 8–11; 700/1, 90

(56) References Cited

U.S. PATENT DOCUMENTS

| | | | | |
|---|---|---|---|---|
| 4,937,743 A | * | 6/1990 | Rassman et al. ............. 345/441 |
| 5,006,983 A | | 4/1991 | Wayne et al. ............... 364/401 |
| 5,242,163 A | | 9/1993 | Fulton | |
| 5,259,613 A | | 11/1993 | Marnell, II | |
| 5,429,361 A | * | 7/1995 | Raven et al. .................. 463/25 |
| 5,505,449 A | | 4/1996 | Eberhardt et al. | |
| 5,611,730 A | | 3/1997 | Weiss | |
| 5,615,121 A | | 3/1997 | Babayev et al. ............. 395/209 |
| 5,761,647 A | * | 6/1998 | Boushy ......................... 463/25 |
| 5,774,877 A | | 6/1998 | Patterson, Jr. et al. ........ 705/35 |
| 5,844,808 A | | 12/1998 | Konsmo et al. | |
| 5,848,395 A | | 12/1998 | Edgar et al. .................... 705/9 |
| 5,850,344 A | | 12/1998 | Conkright .............. 364/479.01 |
| 5,918,209 A | | 6/1999 | Campbell et al. ............... 705/5 |
| 5,920,846 A | | 7/1999 | Storch et al. ................... 705/7 |
| 5,933,354 A | | 8/1999 | Shimada et al. ........ 364/478.16 |
| 5,933,810 A | | 8/1999 | Okawa ........................... 705/5 |
| 5,954,583 A | | 9/1999 | Green | |
| 5,966,068 A | | 10/1999 | Wicks et al. ............ 304/286.01 |
| 5,971,271 A | * | 10/1999 | Wynn et al. ................. 235/380 |
| 5,973,619 A | | 10/1999 | Paredes ...................... 340/994 |
| 5,978,770 A | | 11/1999 | Waytena et al. ................ 705/5 |
| 5,987,421 A | | 11/1999 | Chuang ......................... 705/7 |
| 5,999,808 A | | 12/1999 | LaDue | |
| 6,003,013 A | | 12/1999 | Boushy et al. ................ 705/10 |
| 6,026,375 A | | 2/2000 | Hall et al. ..................... 705/26 |
| 6,049,774 A | | 4/2000 | Roy ............................... 705/8 |
| 6,058,163 A | | 5/2000 | Pattison et al. | |

(Continued)

FOREIGN PATENT DOCUMENTS

GB            1295627            11/1972

(Continued)

OTHER PUBLICATIONS

Pitrak-Player Tracking System Manual, 1995, PRC Gaming Systems, pp. 1-8.*

(Continued)

*Primary Examiner*—Scott Jones
(74) *Attorney, Agent, or Firm*—Fenwick & West LLP (57) ABSTRACT

An automated system uses a decisioning system to schedule service attendants to service events at patron locations. The decisioning system schedules the events for servicing using various factors to establish the priority of different events. Service attendants are paged by the system to inform them of a service to be provided.

48 Claims, 3 Drawing Sheets

U.S. PATENT DOCUMENTS

| | | | |
|---|---|---|---|
| 6,070,142 | A | 5/2000 | McDonough et al. |
| 6,183,362 | B1 | 2/2001 | Boushy |
| 6,257,981 | B1 | 7/2001 | Acres et al. |
| 6,267,671 | B1 * | 7/2001 | Hogan ......................... 463/25 |
| 6,302,793 | B1 | 10/2001 | Fertitta et al. |
| 6,332,099 | B1 | 12/2001 | Heidel et al. |
| 6,345,281 | B1 | 2/2002 | Kardos et al. |
| 6,383,077 | B1 * | 5/2002 | Kweitko et al. .............. 463/40 |
| 6,409,595 | B1 | 6/2002 | Uihlein et al. |
| 6,430,562 | B1 | 8/2002 | Kardos et al. |
| 6,460,848 | B1 | 10/2002 | Soltys et al. |
| 6,470,180 | B1 * | 10/2002 | Kotzin et al. ............ 455/412.1 |
| 6,587,831 | B1 | 7/2003 | O'Brien |
| 6,614,903 | B1 | 9/2003 | Flockhart et al. |
| 2001/0048374 | A1 * | 12/2001 | Blad ...................... 340/870.11 |
| 2002/0107715 | A1 * | 8/2002 | Pace et al. ...................... 705/8 |

FOREIGN PATENT DOCUMENTS

| | | |
|---|---|---|
| JP | 62097034 | 4/1987 |
| JP | 02244260 | 9/1990 |
| JP | 05227339 | 9/1993 |
| WO | WO 00/41104 | 7/2000 |

OTHER PUBLICATIONS

Kuyumcu, A. H., "Gaming with Revenue Management," Talus Solutions, Inc., Scorecard Magazine, pp. 1-8, Summer, 2000.

European Search Report/EP 01 30 9350.

Garwood G.J. et al., "Work Management System," British Telecommunications Engineering, London, GB, vol. 10, no. 3, Oct. 1, 1991, p. 204-210.

Lesaint D., et al., "Dynamic Workforce Scheduling For British Telecommunications PLC," Interfaces, Institute of Management Sciences, Providence, US, vol. 30, No. 1 Jan. 2000, p. 45-46.

Office Action dated Dec. 1, 2004, for U.S. Appl. No. 09/782,677.

Parets, Robin Taylor, "Linked Systems Come of Age", Nov. 1999, International Gaming and Wagering Business, v20, n11, p. 51.

* cited by examiner

AUTOMATED SERVICE SCHEDULING SYSTEM

CROSS REFERENCE TO RELATED APPLICATION

This application claims priority under 35 U.S.C. §119(e) from provisional application Ser. No. 60/245,903 filed on Nov. 3, 2000, which is incorporated by reference herein. This application is also related to Ser. No. 09/782,677 filed on Feb. 12, 2001, by Mark C. Pace and Thomas W. Cook, which application is commonly owned, and incorporated by reference herein.

FIELD OF THE INVENTION

This invention relates to systems for automating the servicing of patrons, and more particularly, to systems variously employing two-way paging and rule-based scheduling systems.

BACKGROUND OF THE INVENTION

Patrons of certain businesses are often in need of services to accommodate their needs and desires. For example, in a casino, players at slot machines (or other types of casino gaming machines) are often in need of services from service attendants, for example to pay out jackpots, correct a problem with the machine, or the like. Presently, the delivery of these and other services to slot machine players is best described as random acts of kindness. This is largely due to the fact that getting slot service is dependent on a service attendant's ability to see visual cues (e.g., flashing "Jackpot" lights) or to hear audible tones (e.g., various alarm sounds) emitted by the slot machine needing service. However, given the amount of activity on a casino floor, especially on busy evenings and weekends, this way of identifying which players need service results in service that is at best, sporadic, and at worst, haphazard, slow, and unsatisfactory to the player. Players often sit for many minutes waiting for a service attendant, unable to continue playing.

To maximize the chance of identifying slot service events and reduce the amount of time it takes to respond to a player's needs, the casino is sectioned into areas, and service attendants roam through the aisles of slot machines in their assigned section. If, as is often the case, a service attendant identifies several simultaneous service needs, she is unable to determine which player needed service first and therefore which to respond to first. This service delivery methodology is not only inefficient, but also tends to upset players who saw other guests attended to first even though they had been waiting for assistance longer.

Various systems that improve on this service methodology have been implemented. These systems fall into two categories, paging systems and dispatch systems. Conventional paging systems rely on a message generated by a Slot Management System (SMS) to identify slot service needs. When a slot machine is in need of service, it sends the SMS a message indicating the type of service required. The SMS in turn, forwards the message to a paging system. The paging system parses out the message, identifies the location of the slot machine and pages the service attendants working in that section of the casino.

This system, although significantly better than the roaming process, has a number of shortcomings. First, these one-way paging systems do not verify that the message was actually received by a service attendant who can actually provide the desired service. The casino operator must have faith that the message was received by the attendant, read, understood, and that the service attendant actually delivered the needed service. Often, either the message is not received or even if received, the attendant is too busy with other tasks to immediately respond to the message, and go to the player in need of service. As a result, the player is still left waiting for service, sometimes for a considerable length of time.

Second, these one-way paging systems are incapable of identifying which service providers in a given section are busy and which are free. Consequently, these systems are designed so that all incoming service requests are sent to all of the service attendants in a given area. As a result, each attendant receives many messages, most of which the attendant cannot respond to. This constant barrage of pages overloads and frustrates the service attendant, leading to pages being ignored, and in some drastic cases, pagers being turned off.

Third, these types of paging systems do not make any attempt to schedule or prioritize the services provided to the players, but rather operate in a strict first-come, first serve fashion.

Dispatch systems are modeled after those used by Police Departments and Emergency Medical Technicians. They rely on human interaction between a dispatcher sitting in front of a number of computer monitors, and the service attendants on the casino floor. A slot machine in need of service sends a message to the SMS that is displayed on the dispatcher's workstation. When the dispatcher sees the service event, she uses a 2-way radio asking for any free service attendant in the appropriate area of the casino to respond to the event. One of the available service attendants will respond, and this attendant is then given the information required and asked to provide the service needed. When the dispatcher is ready to assign another task, she can verify that the service attendant is free and ready to be dispatched again.

This system is better than traditional one-way paging in that it allows the casino operator to verify that the service attendant received the message and that she is delivering the service needed. The two-way communication between two human beings, dispatcher and service attendant creates a strong sense of teamwork and general esprit-de-corps, however this comes at a price. The cost of staffing even a small dispatch center requires at least 4 full time equivalents to cover a modest size casino floor 24 hours a day, seven days week, at an estimated cost of over $160,000 annually.

The implementation of one or both of these systems is a significant improvement over the roaming service delivery methodology, yet both of these systems still rely on a first-in first-out (FIFO) method of slot service scheduling. That is, service attendants are instructed to handle service requests in the order in which they are received. In today's highly marketed casino industry, where customers are rewarded based on their level of play, the FIFO methodology is at odds with the rewards and incentives programs used by casino operators.

More particularly, casinos today have many different types of programs that distinguish players based on their level of gaming activity. Players who play frequently and bet in large amounts are typically considered premium players, and given various types of incentives and "comps," such as free rooms, discounts, and the like. Casinos determine player activity level through various types of bet monitoring techniques, including affinity card programs that use identification cards to track player betting levels in gaming machines. However, when it comes to providing slot service, these premium players are treated no differently than other level players.

Accordingly, it is desirable to provide a system and methodology of service that combines the features of the paging and dispatch system while adding functionality that more closely ties in to the incentive programs used by the casino (or other business) to differentiate its patrons.

Beyond casinos, other types of business establishments also need to provide services to patrons. For example, hotels often support a variety of services for patrons, such as room service, housekeeping, concierge, valet, and so forth. Conventionally, a patron telephones the desired service department, which then sends an available attendant to the patron's room (or other location). Conventional systems schedule services for all patrons on a FIFO basis, without regard of the particular value of the patron to the hotel. To the extent that different patrons obtain different service levels, it results more from happenstance, than from a systematic approach to provide service. The same appears to be true of other business that provide services to customers, such as airlines, cruise ships, hospitals, and so forth.

Thus, it is also desirable to provide systems and methodology of service delivery that scheduling services to patrons of a business in consideration of factors such as the availability of service attendants and the value of the patron to the business.

SUMMARY OF THE INVENTION

In one aspect, the present invention overcomes the limitations of conventional service approaches by using a rule-based system that schedules service attendants to service events associated with patrons by determining a priority for each event. Higher priority events are scheduled for service before lower priority events. When an event is ready for servicing according to its priority, the system selects a service attendant who is available to service the event and a page is transmitted to that service attendant. The priority of events is based on various factors such as the value of the patron to the business, the type of event, and the length of time that the event has been pending for service.

In one particular embodiment useful for servicing players in a casino, the value of player is preferably based on a player's rating, which is a categorization of the player's value to the casino. Player value (also known as player "worth") may be based on various types of analysis of the player's betting activity or other activity from which the casino derives revenue from the player. One useful measure of player value is a player's theoretical win profile, which is an estimate of the casino's expected revenue per time period based on the player's historical betting activity. A player's theoretical win profile is typically updated as the player continues to gamble, and thus, the player's value may change over time in accordance with the player's gaming behavior. Other measures of value of the player may also be employed, such as membership in particular clubs, groups, or organizations. Status of a player (e.g., "VIP") may also be used as a proxy for player value.

The rule-based system periodically updates event priority, so that events that are initially low priority may be upgraded to higher (or highest priority) if they are pending over a certain amount of time. In this manner, the rule-based system allows the casino (or other business) to tailor its service policies to service premium value players more quickly, while ensuring that unrated or lower value players receive service within at least certain minimum standards.

In another embodiment, the present invention utilizes a two-way paging system to identify service attendants who are available to service events. The system keeps track of which service attendants are busy and which are available to service events. The system selects a primary service attendant who is indicated as being available, to receive a page identifying a service event to be handled. The primary service attendant responds with a page that indicates whether she accepts or declines to service the event. If the primary service attendant declines, the system selects a secondary service attendant who is available to service the event, and transmits a page to this secondary service attendant. In this manner, the system ensures that service attendants who can readily service the event are paged, rather than relying on service attendants to volunteer to service events.

In another aspect, the present invention operates to ensure timely servicing of events, so that these events are resolved in an effective and timely manner. The system monitors the amount of time taken by a service attendant to service an event. If the amount of time taken exceeds a threshold amount of time, then a page is transmitted to a supervisor. The supervisor can then attend to the event, for example, by going to the patron's location (e.g. a player's gaming machine), and servicing the event, or may take other actions as appropriate. The aspect further ensures that patron's obtain prompt resolution of their service events.

One system useful in the casino environment includes a number of gaming machines coupled over a network to a slot management system. The gaming machines transmit event information to the slot management system, indicative of events occurring at the gaming machines, some of which may need servicing. The slot management system provides selected event information to a rule-based decisioning system. The rule-based decisioning system includes a set of rules that prioritize events for servicing. The rules are established by the system operator, and include rules that prioritize events based on the player's value or status, the type of event, and the length of time the event has been pending. A paging system receives and transmits pages to and from service attendants. Service attendants use the pagers to indicate whether they can service an event, and optionally to send pages indicating the status of the service, such as that the service is completed.

The invention also has embodiments in software products and computer readable media used to control a computer system in accordance with the teachings and principles of the invention.

Another type of system is useful in the hotels, cruise ships, and similar environment. This type of system includes a number of communication devices disposed at or near locations of the patrons. For example, in a hotel each patron's room may be equipped with a terminal, a computer, or a telephone. The communication devices communicate over an appropriate network to a decisioning system. Patrons use the communication devices to communicate requests for service, such as room service, beverage service, a housekeeping call, a valet request, and so on. Each of these requests may be understood as an event. The decisioning system includes a set of rules that prioritize events for servicing. The rules are established by the system operator (e.g., hotel management), and include rules that prioritize events based on the patron's value or status, the type of event, and the length of time the event has been pending. The patron's value may be determined based on historical activity of the patron, such as historical spending by the patron, or by a proxy of the patron's value, such as a room rate or room type in a hotel (e.g., patrons in more expensive rooms have a higher value because they are more likely to generate higher revenues for the hotel). A paging system receives and transmits pages to and from service attendants. Service attendants use the pagers to indicate whether they can service an event, and optionally to send pages indicating the status of the service, such as that the service is completed. The decisioning system has information pertaining to the location of each patron based on the known location of the communication device used by the patron, and thus can select service attendants assigned to, or available nearby, the patron's location.

The features and advantages described in this summary and the following detailed description are not all-inclusive, and particularly, many additional features and advantages will be apparent to one of ordinary skill in the art in view of the drawings, specification, and claims hereof.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
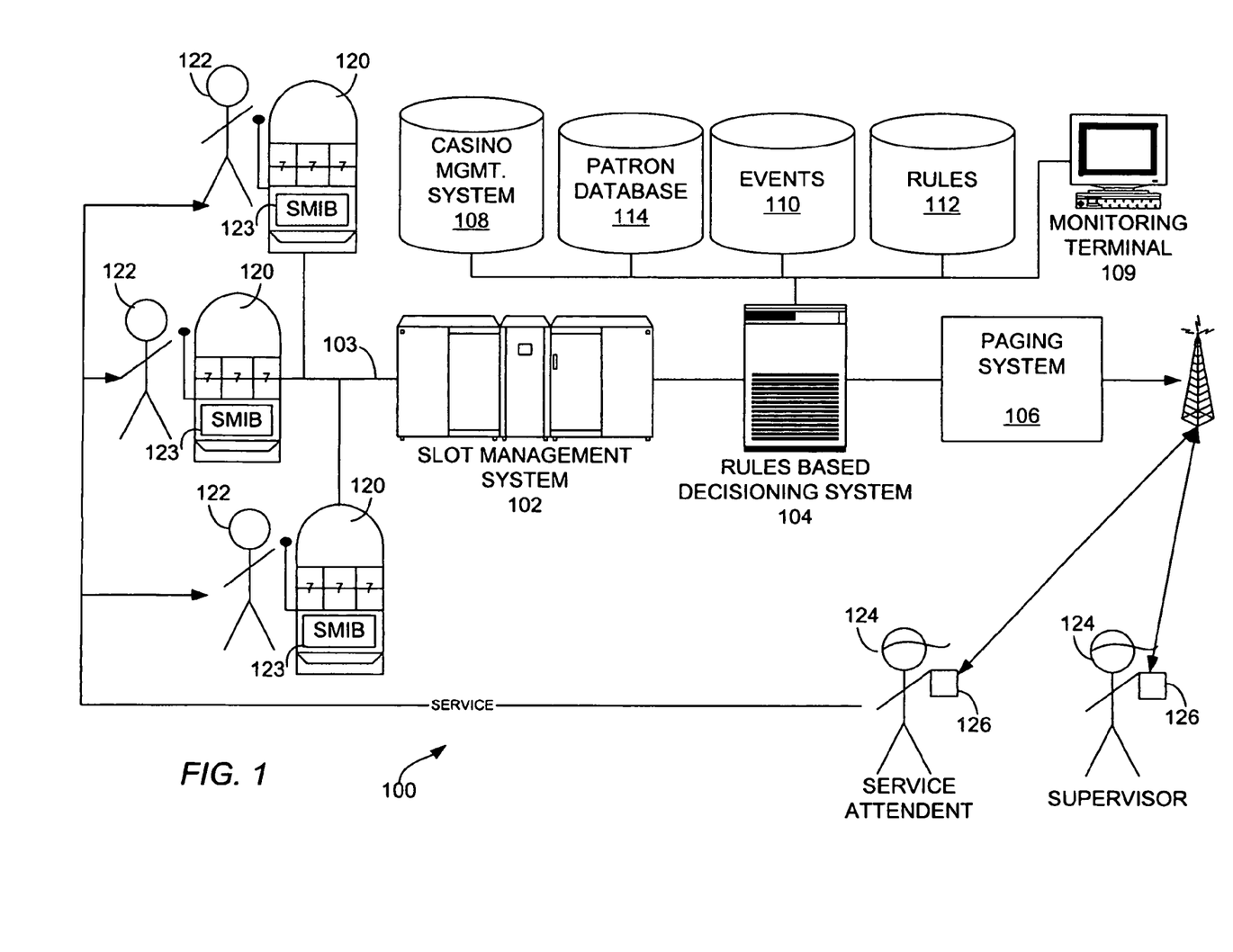
FIG. 1 is a system diagram of a system in accordance with one embodiment of the present invention.

Referring now to FIG. 1, there is shown a system diagram of a system in accordance with one embodiment of the invention. This system 100 operates typically on the premises of a casino or other entertainment facility in which there are a large number of gaming machines 120. In a casino environment, there is provided a slot management system (SMS) 102, a decisioning system 104, a casino management system (CMS) 108, and a communication system 106. A patron database (PDB) 114 may be used instead of CMS 108. In non-casino environments, equivalent functionality of these systems, as further described below, may be provided through equivalent hardware or software systems. In the illustrated embodiment, the decisioning system 104 is a rules-based decisioning system (RBDS), and the system is described hereafter with respect to this particular implementation, though it should be understood that the invention is not limited to this particular type of decisioning system.

Generally, events are generated at service locations and forwarded to the decisioning system 104 for scheduling of service attendants. In the illustrated embodiment of FIG. 1, the service locations are the gaming machines 120. The events are communicated to the SMS, which in turn forwards messages of these events to the RBDS 104. The RBDS 104 schedules the events for service and selects a service attendant for servicing the event, by applying rules relative to the type of service event, the service event time, floor business levels, the player's status or value, and any other attributes useful for scheduling. The RBDS 104 obtains the player related information from the CMS 108. In this disclosure, "value" and "status" are equivalents. On scheduling an event for service by a service attendant 124, the RBDS 104 transmits the service information to the selected attendant 124, such information to include gaming machine number, location, type of service, customer value tier, and event time to the paging system 106. In this embodiment, the customer value tier is data descriptive of a customer's status.

The communication system 106 transmits messages to a plurality of message receivers 126. In the illustrated embodiment, the communication system is a paging system and the message receivers are pagers; the system is described hereafter with respect to this particular implementation. The paging system 106 communicates with the pagers 126, held by service attendants 124 (and their supervisors). The service attendants 124 accept or decline the page, and where accepted, provide the service to the indicated player and gaming machine. Where a service is declined, the RBDS selects another service attendant 124 to service the event. If all of the service attendants 124 within a specified service area decline to service the event, the RBDS 104, using geographical travel data within its rules, determines which service attendants 124 from which other service areas to page. In some instances, when the service attendants 124 within a specified area are busy and all other service attendants 124 identified by the RBDS 104 within its travel rules are likewise busy, events may be escalated by paging a supervisor, e.g. where the event has not been serviced in a certain amount of time. The service attendants 124 provide service to the players 122 as indicated by the page.

An optional monitoring terminal 109 is used to monitor the status of events and their scheduling for service by the supervisor 124.

The gaming machines 120 include generally any kind of gaming machine of interest, such as slot machines, video poker machines, keno machines, and so forth. The gaming machines are played by players 122. Each gaming machine 120 includes a card reader for reading a player identification card, such as may be issued by the casino as part of an affinity program or by an operator of the facility containing the gaming machines. The use of card readers with gaming machines is well known in the art, and thoroughly described, for example, in U.S. Pat. No. 5,429,361, which is incorporated by reference herein. The use of player identification cards for tracking player betting is described in U.S. Pat. No. 5,761,647, which is also incorporated by reference herein.

The gaming machines 120 are coupled over a communications network 103 (e.g. an Ethernet network) to the SMS 102 and communicate gaming events occurring at the machines 120 to the SMS 102 for further processing. Where the gaming machines are slot machines or the like, they include a main processing unit (MPU) (not shown) and a communication device 123. In one embodiment, the communication device is a slot machine interface board (SMIB), also known as a slot interface board (SNI). The MPU is responsible for the gaming machine's operation, and contains the logic and mathematical formulas that allow the game to function. The MPU communicates game events to the SMIB 123, which in turn relays information up to the SMS where it is stored, tracked, and reported on. The SMIBs may be connected to the SMS via a wiring network of twisted pair cabling, and operating using a conventional network operating system. The communicated events also include card-related events occurring at the card reader, such as a card-in event. Typically, the MPU is proprietary to each gaming machine manufacturer, while the SMIB and SMS are proprietary to the SMS developer. Suitable SMS's include the SLOT DATA SYSTEM provided by Bally Gaming & Systems of Las Vegas, Nev., or the GSI ON- LINE SLOT SYSTEM provided by Gaming Systems International, also of Las Vegas. The details of coupling the gaming machines 120 to the SMS 102 are known to those of skill in the art, and provided by the developers of the selected SMS. U.S. Pat. No. 5,429,361, incorporated above, also describes the details of one SMS.

Given the various types of gaming machines, there are numerous different possible gaming machine events. Accordingly, depending on the system developer, various different types of gaming machine events may be selected for servicing by the system, and the present invention does not limit the types of events that may be selected for servicing. In one embodiment, the gaming machine events of interest include jackpot, hopper coin outage, coin-out, coin-in and bill accepter jams. Other, fewer, or additional events may be selected for inclusion in a particular installation. When an event occurs (both those included for servicing and those that are not serviced), the MPU notifies the SMIB that an event has taken place. The SMIB in turn sends the SMS 102 a message containing the appropriate information descriptive of the event. The content of message will depend on the particular SMS in use, but generally event messages include fields such as:

Message Type
Transaction Code
Player Identification Card Number (from player identification card, if available)
Gaming machine Number
Gaming machine Stand (location) Number
Denomination
Theoretical Hold %
Date
Time
Coins Bet
Coins Won
Games Played
Jackpot Amount
Bonus Points
Message ID
Type Code; and
Game Type.

These fields may substantially be the same type of data components that any SMS may send, though the particular fields in message may be customized as desired by the SMS provider. For example, some SMS's use a Side ID to identify a redundant server that is currently active for receiving message; also some SMS's use sequential message IDs in order to track messages and identify missing messages.

It is preferable for the message to contain at least the gaming machine ID and location, and message type; this would at least allow prioritization of gaming machine events by their type. It is further preferable to include player card number, as this further allows identification of the player; hence permitting prioritization based on the player's value. Note that inclusion of the player card number is optional, and preferably used if available, as some players may not have ID cards (e.g., players who have not signed up for such a card). In that event, the field is either not included or left empty. It is also further preferable that for Jackpot Messages, the Jackpot Amount be included as this will allow the service attendant to determine whether Internal Revenue Service required forms will be needed in the processing of this transaction.

As the SMS 102 receives messages from the gaming machines, it stores the messages in its transaction file. In a typical installation, the SMS also sends a notification message to a set of predetermined terminals. These terminals, such as the ones used with the Bally Gaming & Systems' SMS—commonly referred to as Change Booth Terminals (CBs)—can be dumb terminals, desktop computers, or any other type of system, such as a paging system. This process is repeated for every type of gaming machine event being tracked.

For example, assume that a slot machine hits a hand-paid jackpot. Each slot machine is set to dispense limited number of coins into the tray, and once that limit has been reached, the slot machine ceases to dispense coins and enters into a hand-pay lockout mode. The balance of the jackpot is then hand paid by a service attendant. Here then, the MPU notifies the SMIB that this event has taken place. The SMIB then sends a message indicating the message type, jackpot amount, machine ID and location, and so forth, to the SMS. The SMS records this message and notifies the coupled CB's.

The SMS 102 is further coupled over the network 103 to the RBDS 104. In one embodiment, the RBDS acts as a CB terminal, and mimics its interface to the SMS, so that the SMS sends messages to it as if it were another CB terminal. The RBDS operates with two databases, an events database 110 and a rules database 112. The events database 110 maintains information pertaining to game events generated by the gaming machines 120 and the servicing of the events by service attendants. The rules database 112 maintains a set of rules that the RBDS uses to prioritize events and select those for servicing. The RBDS 104 parses each received message from the SMS, and extracts the time, event type, player identification number, machine ID and location, and other data as appropriate (e.g., jackpot amounts for a jackpot event). This information is stored as a new event record in the events database 110 to be prioritized for servicing. The RBDS executes software products which provide the functional and structural features described herein. The RBDS may operate on a conventional computer system, such as a server class computer, with suitable memory, CPU and network connectivity to support a large scale casino operation. A suitable RBDS is the Decision Center provided by Perceptum, Inc. of Bridgewater, N.J.

In one embodiment, the events database 110 is a relational database comprising a number of tables, the primary ones including:

A Pagers table has a list of all the available pager numbers of the service attendants 124, the service attendant carrying the pager and the casino floor section in which he/she is working in. Each pager is also defined as a service attendant pager or supervisor pager to facilitate escalation paging.

An Events table stores open and in-progress service events that are being tracked. As events are completed the data is written as new records in a History table.

The History table stores events that have been serviced and are no longer pending.

The particular fields of the Events table may be defined by the systems developer as desired. In one embodiment, the Events table has columns corresponding to some of the extracted data from the SMS message, along with other columns that are calculated or updated on an ongoing basis:

Service Event Type (identifies the type of service required by a particular machine at a particular time).
Player Identification Card No.
Gaming machine Stand (location) Number.
Jackpot Amount (if any).
Outage Time=time of service event as reported by the SMS.

Age Time=time the service event was pending before being scheduled for service. The RBDS waits until the Age time reaches a threshold before scheduling.

Assigned Time=time the service event was accepted by a service attendant via the pager 126.

Appear Time=time of the service attendant's card-in at the player's gaming machine as reported by SMS.

Completion Time=time a Back In Service message is generated by the gaming machine as reported by SMS and/or time the attendant sent the completed message via the pager 126.

Response Time=(Appear Time−Outage Time)=length of time a player waited before an attendant appeared to provide them service.

Work Time=(Completion Time−Appear Time)=length of time an attendant worked to provide the service needed.

Transaction Time=(Completion Time−Outage Time) =length of time a player waited before the service needed was completed.

The History table also includes these fields.

As can be appreciated, messages from the SMS arrive at the RBDS asynchronously, and thus the RBDS asynchronously updates the Events table with new events. As each event is received, then for each event the RBDS establishes a timer to track the Age time of the event. In one embodiment, the Age time is used to defer scheduling until a certain amount of time has passed. In another embodiment, the RBDS immediately schedules the event according to the rules in the database. In one embodiment, the RBDS includes a time tracking module that manages the time capture and timers for each of the events. When the RBDS receives a message it triggers the time tracking module to capture the appropriate time (e.g. Age time or Completion time) and timers. The RBDS also tracks for each event a Service Elapsed Time, which equals (Current Time−Appear Time).

A separate module of the RBDS prioritizes the events for servicing using the rules database 112.

In one embodiment, the RBDS includes a relational database with a number of real-time processes. These processes are constantly running, returning data, which is then in turn evaluated by other processes. In this way, the RBDS knows what events are aging, what events need to be paged, what events need escalation and what events have been completed and need archiving. As a new event message comes into the RBDS, a primary process is triggered that evaluates the new event in light of all of the other events it is currently tracking. The system applies the rules to the event to create a key which it then uses to prioritize the event along with all of the other events. In addition, as each event is logged, a timing process is assigned to it. The process is given a time alarm and is told to wake up once a specific value has been reached. If the system can move the event from one state to another (e.g., aging to paged, or paged to pending, or pending to completed), the old alarm is replaced by a new one. In this way, the live processes are monitoring events, while each specific event also has its own timer which when triggered cause specific actions to be taken.

The RBDS 104 is coupled over the network 103 to a casino management system (CMS) 108. The CMS maintains a database of customer information, in particular information used to determine a customer's status or value to the casino. In another embodiment, the RBDS 104 is coupled over the network to the PDB 114. The PDB 114 stores patron play, theoretical value, promotional offers, and other patron specific data for individual properties and the company as a whole. More specifically, the PDB 114 stores information pertaining to each customer derived from the customer's gaming activity at multiple casino properties. The RBDS queries the CMS 108 or PDB 114, using the extracted player identification number to obtain information about the player's value. This information is also stored with the event record. An example of a CMS 108 is further described in U.S. Pat. No. 5,761,647; a description of a PDB 114 is found in U.S. Ser. No. 08/680,208, filed on Jul. 11, 1996, which is incorporated by reference herein.

For example, the CMS or PDB may store for each customer information pertaining to the customer's average betting patterns, amounts, wins, loses, and so forth, and optionally information pertaining to each of their trips to the casino's properties. In one embodiment, each customer account includes a calculated theoretical win, which is an estimate, based on the customer's historical betting activities, of revenue the casino expects to generate from the customer. The player's value (e.g. as expressed by theoretical win) may be based on gaming at an individual casino property, or from gaming at multiple casino properties, as described in U.S. Pat. No. 5,761,647. This betting data or other data (e.g., membership in various affinity programs) is used by the casino as it desires to categorize each customer as to their value to the casino.

For example, players may be categorized into tiers, such as a four-tier system with premium, preferred, select, and unrated/unknown players. Players who are not listed in the CMS or who do not present an ID card are deemed unrated. More tiers may also be used. The number of tiers, the data on which the tier classification is based, and the calculation of value to segregate players into tiers is entirely within the discretion of the system operator and not limited by the invention.

The RBDS also includes a rules database 112 that stores the rules used to prioritize events in the Events table for servicing. The selection of which rules to use is entirely within the discretion of the casino and system developer, as selected to meet whatever is determined to be their preferred policies for servicing players. Thus, the specific rules used are not limited by the present invention.

In one embodiment, there are 3 tiers of players, Diamond, Platinum, and Gold (from highest to lowest respectively; the names of the tiers are obviously arbitrary). Membership in a tier is based on a player's value, such as their theoretical win profile. In this embodiment, and by way of example only, the following rules can be used in various combinations to schedule events for service:

1. Diamond Tier customers are the first service priority.
2. Platinum Tier customers are treated like Diamond tier and also have first service priority.
1. New card customers are treated like Diamond and Platinum tier customers and also have first service priority. A new card customer is one whose player identification card was issued within the last thirty (30) days. The RBDS 104 can query the CMS or PDB to determine if a player's card has been issued in the last 30 days (based on a stored card issue date).
4. "No Card" customers are treated like Diamond and Platinum tier customers and also have first service priority. This allows the casino to provide a high level of service to a customer, and thereby increase the likelihood of the customer becoming a loyal patron. Conventionally, no card customers typically receive the lowest level of service.

5. Gold Tier customers have the least service priority.
6. Generate a page to a service attendant if:
   A Diamond or Platinum tier, New Card or No Card customer has waited for longer than 2 minutes (Age Time).
   A Gold tier customer has waited for longer than 5 minutes (Age Time).
7. The maximum Age time for any tier or customer is 7 minutes. If a customer service event has aged for longer than 7 minutes, that service event will be given top priority immaterial of what tier the customer belongs to, or whether they have a card or not. This top priority is higher than Diamond level and places the event at the front of the event queue.
8. If an event has aged 7 minutes and has not been accepted by a service provider, then generate an escalation page to a specified pager(s). If a monitoring terminal 109 is used, then alter the display characteristic (e.g., Red) of those service events.
9. If the service event is not completed within 8 minutes (Service Elapsed Time>8 minutes), then generate an escalation page to a specified pager(s). If a monitoring terminal 109 is used, then alter the display characteristic (e.g., Red) of those service events. The 8 minute time limit is known here as a Service Duration Limit. In an alternate embodiment of the system, this Service Duration Limit may be dependant on the service type, and certainly may vary in amount of time. In this way, the Service Duration Limit for a specific event may be set differently than that of another.
10. Until a service event has been aged to 7 minutes (Rules 8 and 9), its priority is determined by Rules 1–6.
11. Hopper Can't Pay events have a first service priority.
12. Coin In Jams have a second service priority.
13. Jackpots have a third service priority.
14. All other events have a lowest priority.

First, note that rules 1–5 are used to prioritize based on player value. Rule 6 prioritizes based on a combination of player value and time, thereby allowing for very precise management of service levels, and differentiation of service to players based on their value. Rules 7–8 are based on the time taken to service an event. Rules 11–14 prioritize events based on their type.

It should also be noted that the particular time limits in these rules are merely exemplary. The time limits may be altered to obtain different service policies. Further, they may be automatically (or manually) modified during operation if there are more or fewer service attendants on duty to service the events (i.e. more attendants available may be used to reduce the time periods, and fewer attendants may be used to increase the time periods).

By way of example with these rules, Diamond, Platinum, New Card Holders, and No Card Holders will not wait longer than 2 minutes before being scheduled. The longest one of these customers will wait for service to be completed is about 17 minutes:
   2 minutes [original aging time]+
   7 minutes [time the system used up continuously trying to schedule this service with service attendants]+
   8 minutes [time it should take to complete service]+
   minimal travel time.

This is a worst case scenario where the RBDS cycled through all of the appropriate and available service attendants, had them all reject service, and then escalates a page to a supervisor. If the RBDS determines that each of the appropriate service attendants were already marked as busy, it can escalate the page to the supervisory level immediately.

In addition, multiple different rules sets may be available to be used depending on the particular conditions in the casino. For example, different rule sets may be used on weekends, holidays or other periods or events when more players are in the casino and more service attendants are on duty. The RBDS may be configured to automatically select the appropriate rule set for the given day of week, holiday or event. Alternatively, the RBDS may automatically select rules or adjust the time limits based on staff level. In yet another alternate embodiment, since the RBDS is in communication with the CMS it can determine the total number of player identification cards currently active in the casino, and use this value to set the time limits in the rules or to select rule sets. Also, more, fewer, and certainly different rules may be used. For example, if the system determines that all service events are being responded to and completed within the eight minute parameter, and that a number of service attendants are available for service requests, the system may automatically turn off the aging in Rule 9 and immediately schedule and page all service requests while still adhering to the priority rules 1 and 2.

The system will continuously try to schedule a service event so as long as there are available service attendants and as long as they are accepting assignments, and thus the RBDS will not be forced to age any event. However, the moment the RBDS determines that there are more service events than service attendants available, it will engage the scheduling rules.

As noted above, the RBDS may be coupled to a monitoring terminal 109, which may be disposed in a supervisor's office, the cashier's cage, or in any convenient location. This terminal allows a supervisor to monitor the status of the system and visually identify service events that are in need of immediate servicing. The monitoring terminal is used to display, page, and track both non-responded to (Open) and responded to but not completed (In Progress), service events. Preferably, the monitoring terminal includes a touch-screen monitor so that a user may immediately cause the system to immediately select an event for servicing by touching the listed event on the monitor. For each open service event, the monitoring terminal displays the Age Time, so as to let the supervisor know how long each event has been pending without being accepted. As per Rule 7, if an event has aged more than 7 minutes, then its display characteristics are altered (e.g. displayed in red) to alert the supervisor. For each in-progress service event, the monitoring terminal displays the Age Time and Appear Time.

The RBDS also provides a variety of data capturing and reporting features that assist in determining overall system performance and the performance of the service attendants in servicing the players. Using information from the Events and History tables, the RBDS can generate reports on the number of transactions by type (Jackpot including Credit Meter Pay Out, Coin-Out and Coin-in Jams, Bill Acceptor Jams or Hopper Coin Outages) that are being completed. Also, the RBDS can store, report, and display if the monitoring terminal 109 is utilized, in real-time the average Response, Work, and Transaction time of each Service Type for each customer tier, on the touch-screen. This data will allow the service providers to proactively establish the service expectation by informing the patron how much time it is currently taking to complete the specific service transaction. This is especially important if the service transaction requires interaction from multiple departments. The RBDS also can capture, store and report on the number of transactions completed by type, by service attendant and the service time it took to complete (Appear Time, Work Time and Completion Time). The RBDS also can report on service events responded to, or completed prior to, being either paged or displayed on the monitoring terminal.

Using the rules listed in the rules database 112, the RBDS applies the rules to the Events table, to prioritize the events therein and select a highest priority event for servicing. The RBDS further selects an available service attendant to service the event.

In a preferred embodiment, the casino floor is divided into a number of areas, each having a location or zone number; these locations correspond to the gaming machine location numbers used in the SMS message. The RBDS prioritizes events generated in each area separately. For each area, the RBDS selects only service attendants who are assigned to service the area. In selecting a service attendant to service an event, the RBDS attempts to locate an available service attendant, first from the event's location (as indicated by the gaming machine location code) and then from contiguous locations, without exceeding a distance rule which limits the selection to a selected number of other areas of the casino floor. A distance rule, for example, may specify that in a casino with six service areas, events in service area 1 may only be assigned to attendants in areas 1, 2, and 3, while attendants in areas 4–6 are physically too far away to respond within a timely manner. For example, if the RBDS is unable to locate an available service attendant within an event's service area, it will seek an available service attendant within the rules-specified contiguous areas. If an available attendant is found, the RBDS assigns the event to that attendant, immaterial of how many events may be pending in the area for which the service provider is mainly responsible.

In most installations, the selection of service attendants from outside an event service area will only occur when one area is slow while another is much busier. If this volume trend is observed over time, then staffing levels for the various areas can be adjusted so that more service attendants are assigned to the historically busier area. This type of information, along with the various reports on average response time and the like, enable the system to be used to monitor and control staffing levels and assignments for the service attendants, further enhancing customer service.

The RBDS is preferably coupled to a two-way paging system 106. The connection may be via TCP/IP over a network or a serial data communication through a dedicated high-speed modem. One suitable paging system is available through Arch Communications Inc., of Westborough, Mass. Another two-way paging system and apparatus suitable for use on the casino floor is manufactured by Glenayre Electronics Inc, of Charlotte, N.C. Systems utilizing the Motorola ReFlex Confirmed Message Delivery system are desirable in order to further enhance the reliability of the system. Such systems are capable of automatically re-transmitting messages that, due to interference, were not fully delivered to the appropriate paging device. In one embodiment, the paging system 106 is based on the Efficient Mail Submission & Delivery (EMSD), an Internet messaging protocol highly optimized for short messages. EMSD is an extension of the existing Internet email environment that accommodates two-way paging model of usage. Using EMSD, urgent messages are promptly "pushed" to the recipient in a highly efficient manner. The EMSD specifications are open and have been published as Internet RFC-2188 and RFC-2524.

When the RBDS selects an event for servicing and a service attendant, the RBDS determines from the Pagers table the pager number of the service attendant. The RBDS constructs, using templates or scripts, a text page to the service attendant, identifying the gaming machine location, type of event, customer tier and other information useful for servicing the event. For example, a page for a Jackpot event may read "AA-15 JP 2000 D 10." This informs the service attendant to go to slot machine location AA-15 and to payout a $2,000 jackpot (JP) to a Diamond Tier (D) customer and that the average service completion time for this type of event is currently 10 minutes. Of course, any coding scheme may be used as desired by the system designer to convey information to the service attendants.

The RBDS transmits the page to the paging system, which in turn pages the service attendant. The service attendant's pager 126 will vibrate to indicate that a page has been delivered. The service attendant can then accept or decline the page. To do so, the service attendant will use the appropriate function keys on the pagers to locate the response desired and transmit the response, such as the pager's up and down scrolling button, and send button. If the page is accepted, the RBDS records the Accept time and marks the service attendant as "busy"; if the page is declined, then the RBDS selects another available service attendant (or supervisor) and transmits a page to that person to service the event. In this fashion, the system ensures that a player's service need is accepted on a timely basis instead of being left to wait at the mercy of which service attendant happens to volunteer to service the player.

When the assigned attendant arrives at the gaming machine, she inserts a service attendant identification card into the card reader. The SMIB transmits a card-in event to the SMS, which forwards the message to the RBDS; the RBDS records the Appear time, and begins tracking the current working time (per Rule 8) using a Work Timer. If necessary the RBDS will escalate a page to a supervisor if the work time exceeds the allotted time period. When the service is completed, the service attendant removes her card from the card reader, which is reported to the RBDS as a Back In Service message; the RBDS interprets this as Work Completed message. The RBDS then records the Completion time, and moves the event to the History table. The RBDS updates the current statistics of average Response and Transaction times so as to keep the supervisory staff apprised of overall service performance, and marks the service attendant as "available."

Figure 2:
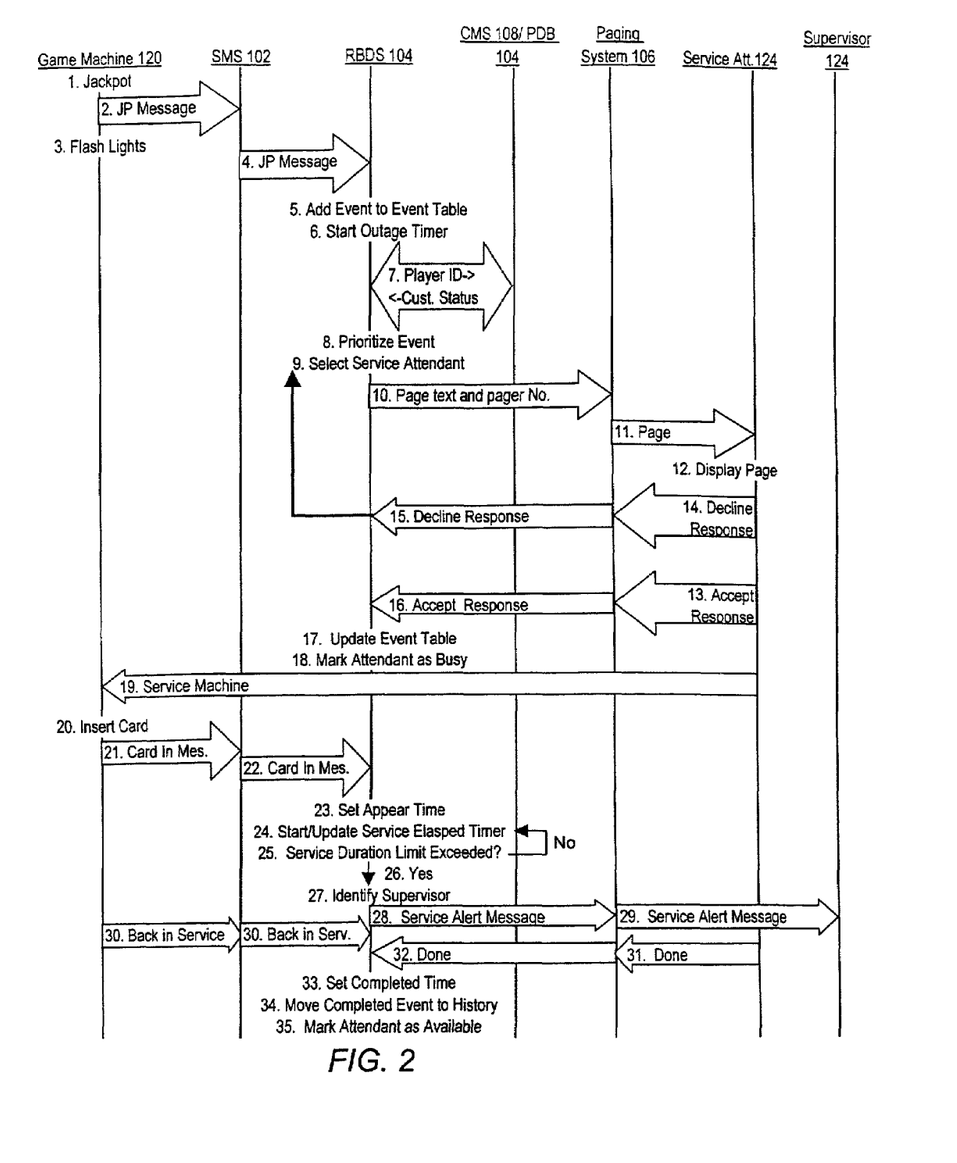
FIG. 2 is an interaction diagram of an exemplary operation of the system of FIG. 1 for servicing a typical event.

Referring now to FIG. 2, there is shown an exemplary event trace of the sequence of actions for servicing a Jackpot service event; the actions for other types of events are similar. If a step requires logic and supports two decisions, the positive decision is addressed first and the negative decision is shown indented.

1. Customer hits jackpot at gaming machine.
2. The gaming machine sends jackpot a (JP) message to the SMS, indicating the gaming machine stand location, jackpot amount, player identification number, event time and other data, for example, as indicated above.
3. The gaming machine locks-up, lights flash, and music plays (optional).
4. The SMS sends the JP message to the RBDS.
5. The RBDS recognizes the JP message, and culls out gaming machine stand location, player identification number, jackpot amount, and event time, and updates the Events table with new event.
6. The RBDS establishes Aging timer to start aging the event based on the Outage time.
7. The RBDS accesses the CMS, providing the player identification number from the player's ID card. The CMS uses the player identification number to lookup or calculate the player's status (e.g. value, level, or tier), and reports this back to the RBDS.

8. The RBDS uses the rules in the rules database 112 to determine the maximum Age Time for this event based on the information returned from the CMS.

9. When the Aging time reaches the maximum threshold amount, based upon the rules defined, the RBDS will decide whether to immediately page a service attendant to service this event or age it further. In this way, a maximum aging time can be established for each event type and each customer tier. If the event has reached its maximum aging time, RBDS selects the next available attendant assigned to service the gaming machine's area. To do this, the RBDS uses the Pagers table, and identifies the first attendant marked as AVAILABLE assigned to service the gaming machine's area. If no attendant in the area is available, the RBDS selects an AVAILABLE attendant in an adjacent area. If no service attendants are available, the event will be escalated and supervisory level staff paged. The RBDS obtains the pager number for the selected attendant or staff.

10. The RBDS sends the pager number and message to the two-way paging system 106.

11. The paging system transmits a page to the service attendant's pager 126.

12. The pager 126 receives the page and displays message.

13. The service attendant selects "Accept" message on the two-way pager 126 and presses "Enter." A response is sent to the paging system. (Goto 16)

14. The service attendant selects the "Decline" message on two-way pager 126 and presses "Enter."

15. The paging system receives the "Decline" message and forwards it to the RBDS. (Goto 9)

16. The paging system receives the "Accept" message and forwards it to the RBDS.

17. The RBDS captures the Assigned Time for the event and updates the event record in the Events table.

18. The RBDS marks the service attendant as BUSY in the Pagers table.

19. The service attendant goes to gaming machine location as specified in the pager message.

20. Service attendant inserts a service attendant identification card into the card reader of the gaming machine.

21. The gaming machine sends Card In message to the SMS.

22. The SMS sends a Card In message to the RBDS.

23. The RBDS captures the Appear Time for the event and updates the event record in the Events table. In some embodiment, the SMS may not generate a Card In message as a valid response to certain events. In these instances, the service attendant uses a keypad on the gaming machine (a typical peripheral device; see U.S. Pat. No. 5,429,361 as an example) to enter a code that will generate a message alerting the RBDS that he/she has arrived at the service location.

24. The RBDS begins a timer for tracking the Service Elapsed Time for the event.

25. The RBDS continually checks to see if the Service Elapsed Time has exceeded the Service Duration Limit for servicing the player, for example, the 8 minutes defined in Rule 8.

26. The RBDS determines that the Service Duration Limit has been exceeded.

27. The RBDS identifies from the Pager table the supervisor operating in the service area and selects appropriate pager number.

28. The RBDS generates "Service Alert" message to the supervisor, identifying the machine location, event type, and other data as before, and sends message and pager number to paging system.

29. Paging system transmits page to the supervisor.

30. The service attendant completes the service required at the gaming machine. The gaming machine sends a "Back In Service" message to the SMS, which forwards it to the RBDS. In some embodiments, the gaming machine may not generate a "Back In Service" message as a valid response to the completion of the required service without certain additional non-related events occurring. (Typically gaming machines do not generate a "Back In Service" message until the gaming machine is played again. In the case of Hopper Fills or a type of Jackpot known as a Credit Meter Pay Out, the customer, once service is completed, does not continue to play the same machine. In cases such as this, the "Back In Service," when generated as a result of the gaming machine being played, will not accurately reflect the true time it took to complete service.) In these instances, the service attendant uses a keypad on the gaming machine (a typical peripheral device; see U.S. Pat. No. 5,429,361 as an example) to enter a code that will generate a "Back In Service" message alerting the RBDS that he/she has completed the service.

31. The service attendant selects "Done" message from pager and presses "Enter."

32. The paging system receives "Done" message and forwards it to RBDS.

33. The RBDS triggers the time tracking module to capture the Completed Time.

34. The RBDS moves the now complete event from the Events table to the History table.

35. The RBDS marks the service attendant as AVAILABLE in the Pagers table.

As can be seen from the foregoing, the decisioning system 104 provides an efficient mechanism for scheduling and prioritizing the service of gaming machine events in a manner to provide differentiated levels of service to players based on their value to the casino. The decisioning system, particularly the rules of the RBDS, can be customized by the casino to provide higher value players with higher levels of customer service, such as faster service response times than lower value players. Even so, the rules can ensure that lower value players are still treated to a basic level of customer service so as to ensure their customer satisfaction as well.

The system may be used in other than casino environments; it may be used in any environment where it is desirable to provide differentiated levels of service to customers, particularly based on each customer's value to the business. For example, the system may be readily extended to the hotel environment to provide varying service levels to patrons based on their value to the hotel.

Figure 3:
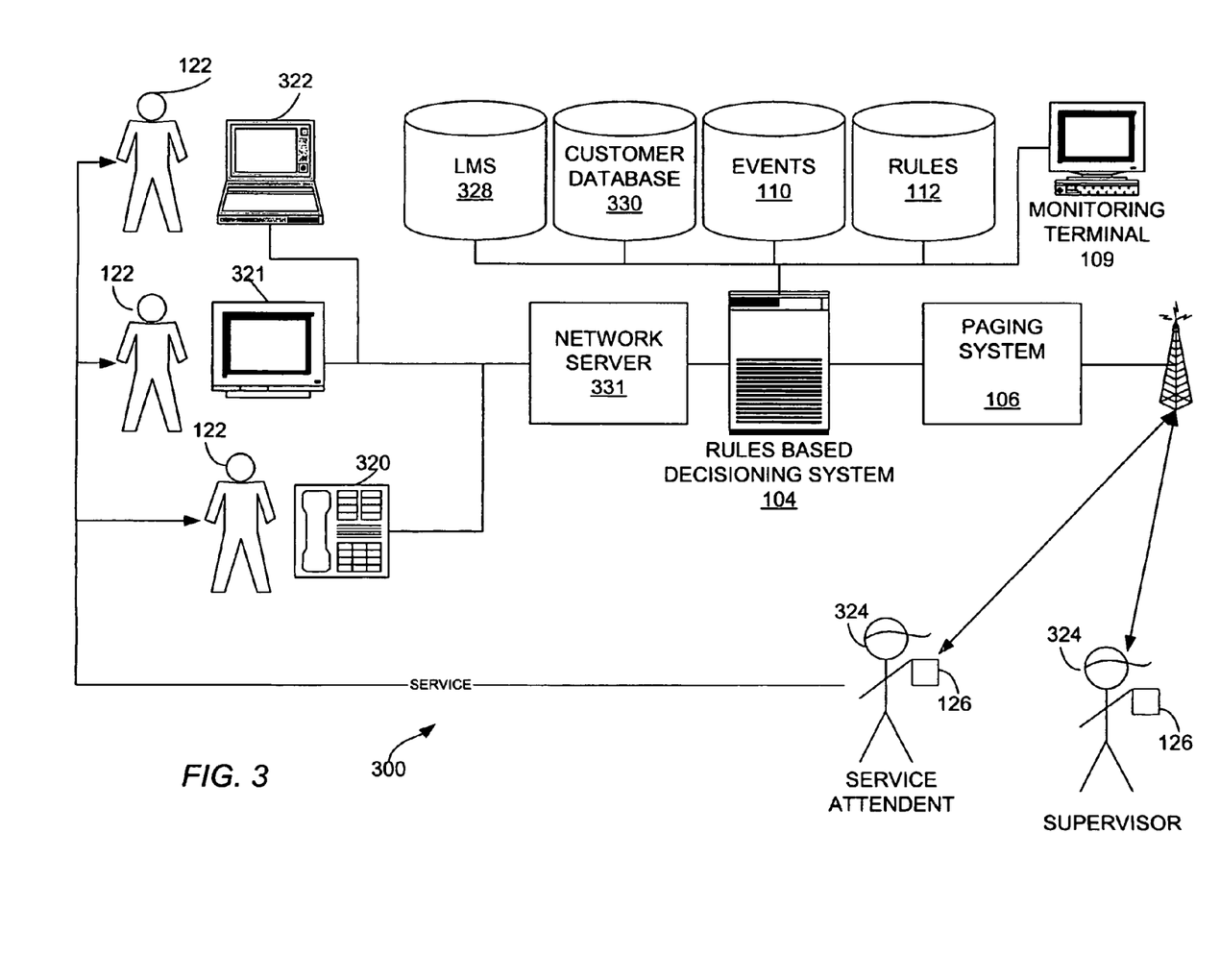
FIG. 3 is a system diagram of a system in accordance with another embodiment of the present invention.

FIG. 3 illustrates an embodiment of such a system. Here, hotel patrons provide requests or messages to the RBDS 104 indicating the type of service they need. To forward such requests, the patrons may use any of variety of different communication devices, such as telephones 320, terminals 321, computers 322, call buttons, or the like. These various devices are coupled over the appropriate network a server 331, which further is coupled to the decisioning system 104. For example, a telephone 320 interfaces with the decisioning system 104 through a voice response unit (not shown) that provides a menu driven interface to allow guests to key in selections of services. A call button may be placed in a hotel room, or on a gaming machine (e.g., where it may be used to request a service attendant for food, beverage, or change service). The terminal or computer connects to the server 331 over a suitable network configuration (e.g. a browser, HTTP server, TCP/IP protocol, Ethernet network). The patron's value may determined from historical information about the patron's spending at the hotel (as may be stored in and determined from a customer database 330), for example to provide an estimate of the expected spending of patron during the current stay, or merely a categorization of the patron's overall status. Alternatively, the value of the patron may be based on proxies, such as by the type of guest room, room rate, room location, number of persons in a party, denomination of the gaming machine the patron is playing at, or other similar factors correlated with measures of customer value, which may be accessed by the decisioning system 104 from the lodging management system 328, a system which tracks rooms, rates, reservations, and other lodging functions. Hotel service attendants 324 (e.g. housekeeping, room service, valet, slot hostesses, beverage hostesses, etc.) would be scheduled for service based on this value metric and other factors, such as location of the patron's room to determine nearby or available attendants.

This type of embodiment is further possible in environments such as on cruise ships, amusement parks, restaurants, and so forth. The system as disclosed herein is most easily adapted to environments in which patrons can be individually located and individually identified. The individual location is desirable in order to direct a service attendant to the patron. The individual location is most easily inferred from the known location of the communication device that forwards the event/request information to the decisioning system. Thus, in the casino environment, the identity and location of each gaming machine is known. In the hotel or similar environment, the location and identity of each communication device is also known (i.e., which room, table, cabin, facility the device is in). The individual identification is desirable in order to determine the patron's value or some substitute measure thereof, as variously explained above. In some applications, these two aspects may be determined by a single factor, such as in the hotel environment where the location of the communication device in a particular room determines both the location of the patron and a measure of the patron's value (e.g., room type or rate of that room). While its further desirable to determine ahead of time the type of service needed—and thereby allow rules to be implemented for scheduling based on service type—this is not necessary. In these types of embodiments, events are communicated from the service locations to the decisioning system by various communication devices, such as by a telephone, computer terminal, call button, or other communication mechanism. For example, a call button or an LCD panel with a touchscreen, or other means may be provided to patrons to signal the need for service. Thus, the present invention is not limited to the particular types of locations or mechanisms that may be used to generate service event information.

As will be understood by those familiar with the art, the invention may be embodied in other specific forms without departing from the spirit or essential characteristics thereof. For example, the particular rules used by the decisioning system may be varied considerably as desired by the system operator to effect different service policies. As noted, fewer, greater, or other rules may be used. Fewer or greater customer tiers may be employed. Any variety of different timing rules may be defined to establish multiple levels of service. Pages can be provided to tertiary service attendants if the secondary service attendant declines. Pages may be escalated to supervisors for other conditions, including overall service conditions based on aggregate performance criteria (e.g. average service times during the past hour). Further, while a rule based decisioning system is most desirable (as it allows discrete definition of service policies, times, and tiers), other equivalent decisioning systems may be employed to the extent that they can be adapted to learn externally defined service policies and applying those policies to asynchronously received events in order to schedule such events for service.

Other changes may be made to the communication system. First, while a two-way paging system is desirable communication system, a one-way paging system may be used; this configuration still allows the decisioning system to schedule service attendants based on factors such as the patron's value. In this case, the decisioning system may be configured to use other information to schedule a secondary service attendant or escalate a page to a supervisor. For example, instead of relying upon an accept or decline message from the pagers, the decisioning system may instead use other messages as indicating acceptance of the service event. For example, in the casino environment, the decisioning system may accept the Card In message (see step 22 above) as indicative of acceptance of the service, since the message indicates the particular service attendant is at the machine to be serviced. In other embodiments, the acceptance message may be sent by the service attendant from the communication device at the patron's location. The various rules are then modified to allow a sufficient amount of time for a service attendant to travel to the patron's location, whether gaming machine, hotel room, cabin, or the like. If the message indicative of acceptance (e.g. the Card In message) is not received in such a time period, then a secondary service attendant can be paged or the page escalated to a supervisor. Again, other rules may be employed to develop a useful service policy for servicing events in light of different information available in a one-way paging system.

If two-way communication is desired, the paging system may be replaced by any two-way communications system, including but not limited to radio systems, cellular systems or the like. The pagers likewise may be simple two-way pagers, or more sophisticated devices such as cellular devices (e.g., Nokia 9110i Communicator™; Motorola Timeport™ P930 Two-Way Pager), or personal digital assistants (e.g., 3Com's Palm™ computer; Handspring Inc.'s Visor™ computer).

The SMS is a particular system used in casinos to communicate with casino gaming machines. Accordingly, in order environments where gaming machines are not the source of service events, other such event-reception systems may be employed, the details of which are dependent on the application environment. Generally, the SMS may be replaced by a server that receives messages (preferably asynchronously) from the service locations, and routes them to a decisioning system. Those of skill in the art can readily identify and adapt the most appropriate system for such a function given the application requirements and environment.

Likewise, the particular naming of the features, attributes, data structures, service events, tables, rules or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A system for providing service to customers at service locations, each service location having a communication device adapted to communicate one or more events pertaining to a service event for a customer at the service location, the system comprising:
   a decisioning system communicatively coupled to the communication devices to receive the events, and including a plurality of rules for scheduling the events for service, the decisioning system selecting a primary service attendant from a plurality of service attendants for servicing each event;
   a communication system communicatively coupled to the decisioning system to transmit a message to the primary service attendant selected for an event, the message indicating the service location at which the event is to be serviced; and
   a plurality of message receivers, used by the service attendants, the primary service attendant using a message receiver to receive the message from the communication system,
   wherein the service locations are gaming machines, and the communication devices communicate game events to a gaming machine management system.

2. The system of claim 1, wherein the gaming machines are slot machines, and the communication devices are interface boards that communicate slot events to the gaming machines system.

3. The system of claim 1, wherein the communication system is a two-way messaging system, whereby the message receivers can transmit and receive messages.

4. The system of claim 3, wherein:
   the primary service attendant can accept or decline to service an event using the two-way message receiver, and wherein:
   in response to the primary service attendant declining to service an event, the decisioning system selects a secondary service attendant for servicing the event, and the messaging system transmits a message to the secondary service attendant to service the event.

5. The system of claim 3, wherein:
   the primary service attendant can accept or decline to service an event using the two-way message receiver, and wherein:
   in response to the primary service attendant accepting to service an event, the decisioning system establishes the primary service attendant as being unavailable to service another event until the primary service provider completes service of the accepted event.

6. The system of claim 1, wherein the decisioning system monitors the time taken to service each event, and responsive to time taken to service an event exceeding a threshold amount, the decisioning system selects an employee to notify of the incomplete service, and instructs the messaging system to transmit a message to the selected employee.

7. The system of claim 1, wherein the rules of the decisioning system for scheduling events include:
   at least one rule for scheduling events according to an age of the event.

8. The system of claim 1, wherein the rules of the decisioning system for scheduling events include:
   at least one rule for scheduling events according to a type of event.

9. The system of claim 1, wherein the rules of the decisioning system for scheduling events include:
   at least one rule for scheduling events according to a location of the service location.

10. The system of claim 1, wherein the rules of the decisioning system for scheduling events include:
    at least one rule for selecting a service attendant for servicing an event based on a location of the service location which generated the event and an assigned location of the service attendant.

11. The system of claim 1, wherein the rules of the decisioning system for scheduling events include:
    at least one rule for messaging a supervisor of the primary service attendant if the primary service attendant has not completed servicing the event in a certain amount of time.

12. A system for providing service to customers at plural service locations, each service location having a communication means for communicating one or more events pertaining to a service event for a customer at the service location the system comprising:
    a computer implemented decision making means communicatively coupled to the plurality of communication means for receiving the events, the decision making means scheduling a primary service attendant from a plurality of service attendants for servicing each event using a plurality of rules;
    a messaging means communicatively coupled to the decision making means for transmitting a message to the primary service attendant selected for an event, the message indicating the service location at which the event is to be serviced; and
    a plurality of message receiving means, used by the service attendants, the primary service attendant using a message receiving means for receiving the message from the messaging means,
    wherein the service locations are gaming machines, and the communication device communicate game events to a gaming machine management system.

13. The system of claim 12, wherein the gaming machines are slot machines, and the communication devices are interface boards that communicate slot events to the gaming machine management system.

14. The system of claim 12, wherein the communication system is a two-way messaging system, whereby the message receivers can transmit and receive messages.

15. The system of claim 12, wherein:
    the primary service attendant can accept or decline to service an event using the two-way message receiver, and wherein:
    in response to the primary service attendant declining to service an event, the decision making means selects a secondary service attendant for servicing the event, and the messaging system transmits a message to the secondary service attendant to service the event.

16. The system of claim 12, wherein:
the primary service attendant can accept or decline to service an event using the two-way message receiver, and wherein:
in response to the primary service attendant accepting to service an event, the decision making means establishes the primary service attendant as being unavailable to service another event until the primary service provider completes service of the accepted event.

17. The system of claim 12, wherein the decision making means monitors the time taken to service each event, and responsive to time taken to service an event exceeding a threshold amount, the decision making means selects an employee to notify of the incomplete service, and instructs the messaging system to transmit a message to the selected employee.

18. The system of claim 12, wherein the rules of the decision making means for scheduling events include:
at least one rule for scheduling events according to an age of the event.

19. The system of claim 12, wherein the rules of the decision making means for scheduling events include:
at least one rule for scheduling events according to a type of event.

20. The system of claim 12, wherein the rules of the decision making means for scheduling events include:
at least one rule for scheduling events according to a location of the service location.

21. The system of claim 12, wherein the rules of the decision making means for scheduling events include:
at least one rule for selecting a service attendant for servicing an event based on a location of the service location which generated the event and an assigned location of the service attendant.

22. The system of claim 12, wherein the rules of the decision making means for scheduling events include:
at least one rule for messaging a supervisor of the primary service attendant if the primary service attendant has not completed servicing the event in a certain amount of time.

23. A system for servicing customers at gaming machines the system comprising:
means for transmitting from a gaming machine to a gaming machine management system a message pertaining to a game event at the gaming machine and for which a customer at the gaming machine needs service by a service attendant;
means for receiving the transmitted message;
means, coupled to obtain the transmitted message from the receiving means, for scheduling the game event, using a plurality of scheduling rules, for servicing by a service attendant;
means for selecting a first service attendant for servicing the scheduled event; and
means for transmitting a message to the first service attendant identifying the gaming machine to be serviced for the game event.

24. A method of servicing customers at service locations, the method comprising:
transmitting from a communication device at a service location a message pertaining to an event at the service location and for which a customer at the service location needs service by a service attendant;
receiving the transmitted message and scheduling the event, using a plurality of scheduling rules, for servicing by a service attendant;
selecting a first service attendant for servicing the scheduled event; and
transmitting a message to the first service attendant identifying the service location to be serviced for the event,
wherein the service locations are gaming machines, and the communication device communicates game events to a gaming machine management system.

25. The method of claim 24, further comprising:
receiving from the first service attendant a message declining to service an event;
selecting a second service attendant to service the event; and
transmitting a message to the second service attendant to service the event.

26. The method of claim 24, wherein:
receiving from the first service attendant a message accepting to service an event; and
establishing the first service attendant as being unavailable to service another event until the first service provider completes service of the accepted event.

27. The method of claim 26, wherein the message from the first service attendant is transmitted from a communication device fixed at the service location.

28. The method of claim 24, further comprising:
monitoring a time taken to service the event; and
responsive to the time taken to service an event exceeding a threshold amount, transmitting a message to another employee to notify of the incomplete service.

29. The method of claim 24, further comprising:
monitoring an aggregate performance criteria for servicing the events; and
responsive the aggregate performance criteria exceeding a threshold amount, transmitting a message to supervisor.

30. The method of claim 24, further comprising:
responsive to not receiving, within a predetermined amount of time, an acceptance from the first service attendant of the message to service the event, transmitting a message to a second service attendant to service the event.

31. The method of claim 24, wherein the scheduling rules include:
at least one rule for scheduling events according to an age of the event.

32. The method of claim 24, wherein the scheduling rules include:
at least one rule for scheduling events according to a type of event.

33. The method of claim 24, wherein the scheduling rules include:
at least one rule for scheduling events according to a location of the service location.

34. The method of claim 24, wherein the scheduling rules include:
at least one rule for selecting a service attendant for servicing an event based on a location of the service location which generated the event and an assigned location of the service attendant.

35. The method of claim 24, wherein the scheduling rules include:
at least one rule for messaging a supervisor of the first service attendant if the first service attendant has not completed servicing the event in a certain amount of time.

36. A method of servicing customers at a service location, the method comprising:
receiving from the service location, event messages pertaining to service location events;

scheduling selected events for servicing by service attendants using a plurality of scheduling rules;

selecting service attendants for servicing each scheduled event; and for each scheduled event, transmitting a message to the selected service attendant identifying the service location to be serviced.

wherein the service locations are gaming machines, and the service location events include a jackpot at a gaming machine.

37. The method of claim 36, wherein scheduling selected events further comprises scheduling the selected events using scheduling rules pertaining to an amount of time an event has been pending, an evaluation of the customer's status, and a type of the events.

38. A system for providing service to customers at service locations, wherein each service location having a communication device adapted to communicate one or more events pertaining to the status of a customer at the service location, the system comprising:

a decisioning system for scheduling the events for service, by receiving the events from the communication devices and using a plurality of rules to select a primary service attendant for servicing each event, to produce a periodically updated event service schedule;

a communication system for transmitting a message to the primary service attendant selected for an event, by way of a two-way communication network, to produce a message indicating to the primary service attendant the service location at which the event is to be serviced; and a plurality of message receivers, each service attendant having one of the message receivers, for receiving the messages from the communication system, by way of the two-way communication network, and for providing the message to a service attendant, wherein the service locations are gaming machines, and the communication devices communicate game events to a gaming machine management system.

39. A system for providing service to customers at service locations, each service location having a communication device adapted to communicate one or more events pertaining to a service event for a customer at the service location, the system comprising:

a decisioning system communicatively coupled to the communication devices to receive the events, and including a plurality of rules for scheduling the events for service, the decisioning system selecting a primary service attendant for servicing each event, wherein the rules of the decisioning system for scheduling events include at least one rule for scheduling events according to a location of the service location;

a communication system communicatively coupled to the decisioning system to transmit a message to the primary service attendant selected for an event, the message indicating the service location at which the event is to be serviced; and a plurality of message receivers, used by the primary service attendant, to receive the message from the communication system.

40. A system for providing service to customers at service locations, each service location having a communication device adapted to communicate one or more events pertaining to a service event for a customer at the service location, the system comprising:

a decisioning system communicatively coupled to the communication devices to receive the events, and including a plurality of rules for scheduling the events for service, the decisioning system selecting a primary service attendant for servicing each event, wherein the rules of the decisioning system for scheduling events include at least one rule for selecting a service attendant for servicing an event based on a location of the service location which generated the event and an assigned location of the service attendant;

a communication system communicatively coupled to the decisioning system to transmit a message to the primary service attendant selected for an event, the message indicating the service location at which the event is to be serviced; and a plurality of message receivers, used by the primary service attendant, to receive the message from the communication system.

41. A system for providing service to customers at service locations, each service location having a communication device adapted to communicate one or more events pertaining to a service event for a customer at the service location, the system comprising:

a decisioning system communicatively coupled to the communication devices to receive the events, and including a plurality of rules for scheduling the events for service, the decisioning system selecting a primary service attendant for servicing each event, wherein the rules of the decisioning system for scheduling events include at least one rule for messaging a supervisor of the primary service attendant if the primary service attendant has not completed servicing the event in a certain amount of time;

a communication system communicatively coupled to the decisioning system to transmit a message to the primary service attendant selected for an event, the message indicating the service location at which the event is to be serviced; and a plurality of message receivers, used by the primary service attendant, to receive the message from the communication system.

42. A system for providing service to customers at plural service locations, each service location having a communication means for communicating one or more events pertaining to service event for a customer at the service location the system comprising:

a computer implemented decision making means communicatively coupled to the plurality of communication means for receiving the events, the decision making means scheduling a primary service attendant for servicing each event using a plurality of rules, wherein the rules of the decision making means for scheduling events include at least one rule for scheduling events according to a location of the service location;

a messaging means communicatively coupled to the decision making means for transmitting a message to the primary service attendant selected for an event, the message indicating the service location at which the event is to be serviced; and a plurality of message receiving means, used by the primary service attendant, for receiving the message from the messaging means.

43. A system for providing service to customers at plural service locations, each service location having a communication means for communication one or more events pertaining to a service event for a customer at the service location the system comprising:

a computer implemented decision making means communicatively coupled to the plurality of communication means for receiving the events, the decision making means scheduling a primary service attendant for servicing each event using a plurality of rules, wherein the rules of the decision making means for scheduling events include at least one rule for selecting a service attendant for servicing an event based on a location of the service location which generated the event and an assigned location of the service attendant;

a messaging means communicatively coupled to the decision making means for transmitting a message to the primary service attendant selected for an event, the message indicating the service location at which the event is to be serviced; and a plurality of message receiving means, used by the primary service attendant, for receiving the message from the messaging means.

44. A system for providing service to customers at plural service locations, each service location having a communication means for communicating one or more events pertaining to a service event for a customer at the service location the system comprising:

a computer implemented decision making means communicatively coupled to the plurality of communication means for receiving the events, the decision making means scheduling a primary service attendant for servicing each event using a plurality of rules, wherein the rules of the decision making means for scheduling events include at least one rule for messaging a supervisor of the primary service attendant if the primary service attendant has not completed servicing the event in a certain amount of time;

a messaging means communicatively coupled to the decision making means for transmitting a message to the primary service attendant selected for an event, the message indicating the service location at which the event is to be serviced; and a plurality of message receiving means, used by the primary service attendant, for receiving the message from the messaging means.

45. A method of servicing customers at service locations, the method comprising:

transmitting from a communication device at a service location a message pertaining to an event at the service location and for which a customer at the service location needs service by a service attendant;

receiving the transmitted message and scheduling the event, using a plurality of scheduling rules, for servicing by a service attendant;

selecting a first service attendant for servicing the scheduled event; and transmitting a message to the first service attendant identifying the service location to be serviced for the event monitoring an aggregate performance criteria for servicing the events; and responsive the aggregate performance criteria exceeding a threshold amount, transmitting a message to supervisor.

46. A method of servicing customers at service locations, the method comprising:

transmitting from a communication device at a service location a message pertaining to an event at the service location and for which a customer at the service location needs service by a service attendant;

receiving the transmitted message and scheduling the event, using a plurality of scheduling rules, for servicing by a service attendant, wherein the scheduling rules include at least one rule for scheduling events according to a location of the service location;

selecting a first service attendant for servicing the scheduled event; and transmitting a message to the first service attendant identifying the service location to be serviced for the event.

47. A method of servicing customers at service locations, the method comprising:

transmitting from a communication device at a service a message pertaining to an event at the service location and for which a customer at the service location needs service by a service attendant;

receiving the transmitted message and scheduling the event, using a plurality of scheduling rules, for servicing by a service attendant, wherein the scheduling rules include at least one rule for selecting a service attendant for servicing an event based on a locating of the service location which generated the event and an assigned location of the service attendant;

selecting a first service attendant for servicing the scheduled event; and transmitting a message to the first service attendant identifying the service location to be serviced for the event.

48. A method of servicing customers at service locations, the method comprising:

transmitting from a communication device at service location a message pertaining to an event at the service location and for which a customer tat the service location needs service by a service attendant;

receiving the transmitted message and scheduling the event, using a plurality of scheduling rules, for servicing by a service attendant, wherein the scheduling rules include at least one rule for messaging a supervisor of the primary service attendant if the primary service attendant has not completed servicing the event in a certain amount of time;

selecting a first service attendant for servicing the scheduled event; and transmitting a message to the first service attendant identifying the service location to be serviced for the event.

* * * * *

UNITED STATES PATENT AND TRADEMARK OFFICE
CERTIFICATE OF CORRECTION

PATENT NO. : 6,962,531 B2
DATED : November 8, 2005
INVENTOR(S) : Mark C. Pace et al.

It is certified that error appears in the above-identified patent and that said Letters Patent is hereby corrected as shown below:

Column 20,
Line 48, change "device" to -- devices --.

Column 23,
Line 7, change "." (period punctuation mark) to -- , -- (comma punctuation mark).
Line 34, change "messages" to -- message --.

Column 24,
Line 42, insert -- a -- before "service".

Column 26,
Line 20, insert -- location -- after "service".
Line 37, insert -- a -- before "service".
Line 39, change "tat" to -- at --.

Signed and Sealed this

Fourth Day of April, 2006

JON W. DUDAS
*Director of the United States Patent and Trademark Office*